United States Patent
Hull et al.

(10) Patent No.: US 7,299,412 B1
(45) Date of Patent: Nov. 20, 2007

(54) METHODS AND APPARATUSES FOR PUBLICATION OF UNCONSCIOUSLY CAPTURED DOCUMENTS

(75) Inventors: Jonathan J. Hull, San Carlos, CA (US); Kurt W. Piersol, Santa Cruz, CA (US)

(73) Assignee: Ricoh Co., Ltd., Tokyo (JP)

( * ) Notice: Subject to any disclaimer, the term of this patent is extended or adjusted under 35 U.S.C. 154(b) by 338 days.

(21) Appl. No.: 09/571,949

(22) Filed: May 15, 2000

(51) Int. Cl.
*G06F 17/21* (2006.01)

(52) U.S. Cl. .................................................. 715/530
(58) Field of Classification Search ................. 715/530
See application file for complete search history.

(56) References Cited

U.S. PATENT DOCUMENTS

| | | | |
|---|---|---|---|
| 5,764,972 A * | 6/1998 | Crouse et al. ................. 707/1 |
| 5,893,908 A * | 4/1999 | Cullen et al. .................. 707/5 |
| 5,924,074 A * | 7/1999 | Evans ............................. 705/3 |
| 6,237,011 B1 * | 5/2001 | Ferguson et al. ........... 715/515 |
| 6,622,174 B1 * | 9/2003 | Ukita et al. ................. 709/246 |
| 6,638,313 B1 * | 10/2003 | Freeman et al. ......... 715/500.1 |
| 6,704,118 B1 * | 3/2004 | Hull et al. ................. 358/1.15 |

\* cited by examiner

*Primary Examiner*—Doug Hutton
(74) *Attorney, Agent, or Firm*—Blakely, Sokoloff, Taylor & Zafman LLP

(57) ABSTRACT

Methods and apparatuses for searching unconsciously captured documents and publishing the results are disclosed. Documents processed by one or more networked devices are saved to a storage device coupled to the network. The documents can be searched to retrieve desired documents. In one embodiment, the desired documents are published in response to a single user action, for example, a mouse click or a spoken command. The documents can be published, for example, on the World Wide Web via a Web server or other devices. The documents can also be published to other networks, distributed via electronic mail, or published in any other manner.

47 Claims, 8 Drawing Sheets

US 7,299,412 B1

METHODS AND APPARATUSES FOR PUBLICATION OF UNCONSCIOUSLY CAPTURED DOCUMENTS

FIELD OF THE INVENTION

The invention relates to data processing. More specifically, the invention relates to search and publication of unconsciously captured documents, where the publication can be in response to a single action by a user (e.g., a single-click).

BACKGROUND OF THE INVENTION

The recent proliferation of digital communication networks, ranging from local area and wide area networks (LAN/WAN) to personal home networks, has created a multitude of pathways through which electronic devices may communicate. The group of devices capable of being networked is no longer limited to just computers, but has expanded to include devices such as printers, copiers, and even facsimile machines to name just a few.

As the number of networked devices continues to grow, so too does the amount of data processed by these devices. It is not uncommon for individuals in an office setting to send and receive large amounts of data in both electronic and printed formats daily.

A large percentage of the data sent and received by individuals tends to be in the form of electronic mail (email). Typically, when an individual receives email they read it and then choose to either save a copy of the message or delete it. Often, individuals will read a particular piece of email and subsequently delete it only to find at a later date that they should have saved the email. Similarly, individuals who save email messages may misplace one or more messages over a period of time. If the individual is located in an office that maintains a systems administrator, they may be able to have the message recovered or found. Unfortunately, however, it is difficult to identify a specific message once it is deleted and searching for a misplaced message can prove time consuming as well.

Electronic data including word processing files, spreadsheet files, and images are not immune to deletion or misplacement either. After creation, these types of files may be sent to another individual in electronic format, or more typically printed out. It is common for an individual working on a draft version of a file to print multiple versions of the file at various times. An individual may unwittingly delete an old version of a file only to discover that the saved version of the file is even older.

It is therefore desirable to have a system that manages electronic files and documents that originate from a variety of sources with reduced, or even minimized, user intervention and provides a straightforward interface for efficient electronic file retrieval. It is also desirable to provide a system for conveniently publishing documents that have been retrieved.

SUMMARY OF THE INVENTION

Methods and apparatuses for publication of unconsciously captured documents is described. One or more documents are selected from a set of unconsciously captured documents. The one or more documents are published in response to a predetermined single action performed by on an electronic system.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Figure 1:
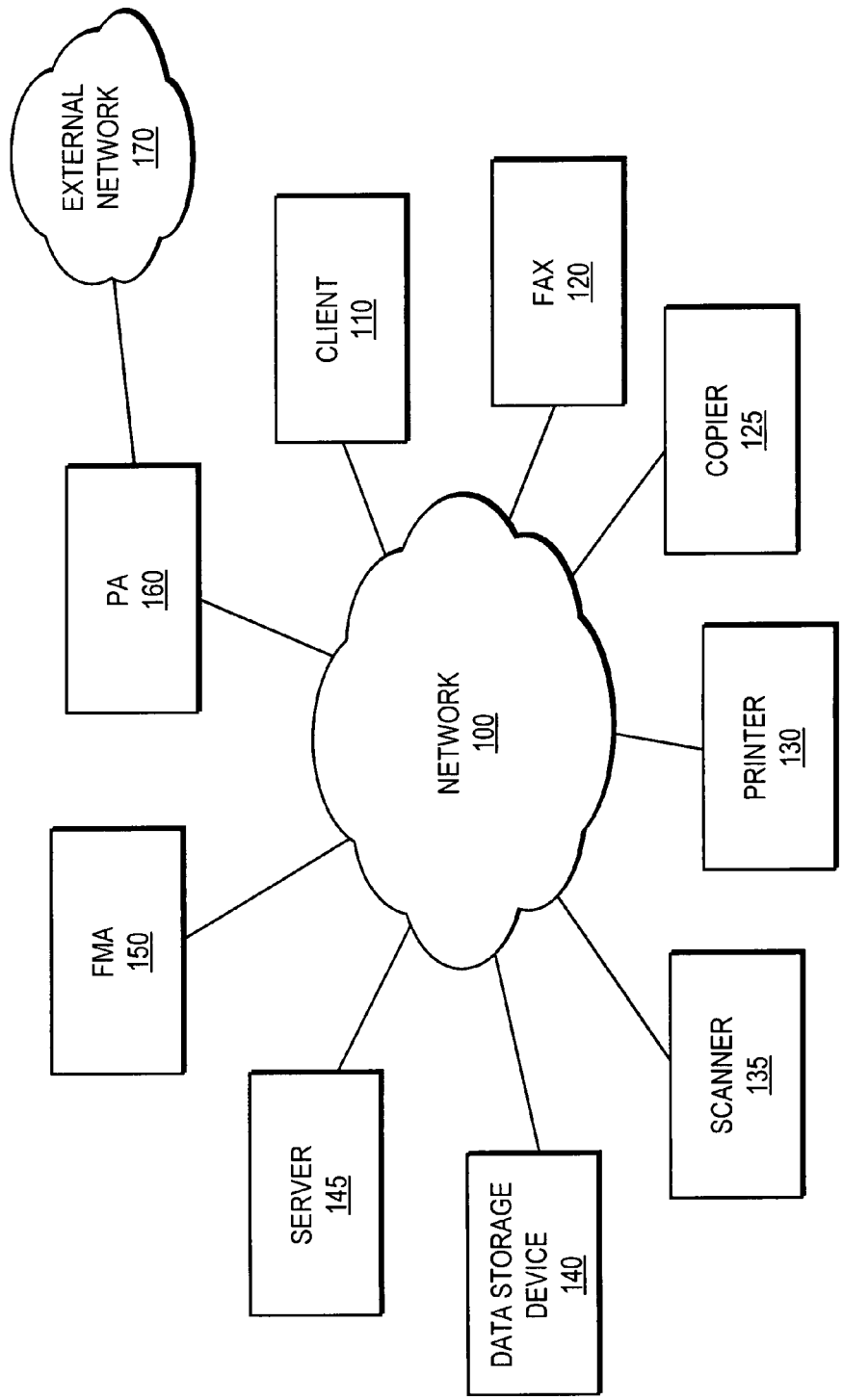
FIG. 1 illustrates one embodiment of a file management system.

Methods and apparatuses for searching both external public documents and internal private documents in response to a single search request is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Methods and apparatuses for searching unconsciously captured documents and publishing the results are disclosed. Documents processed by one or more networked devices are saved to a storage device coupled to the network. The documents can be searched to retrieve desired documents. In one embodiment, the desired documents are published in response to a single user action, for example, a mouse click or a spoken command. The documents can be published, for example, on the World Wide Web via a Web server or other devices. The documents can also be published to other networks, distributed via electronic mail, or published in any other manner.

System Overview

FIG. 1 illustrates one embodiment of a file management system. Client 110 represents a general purpose digital computer coupled to network 100. Network 100 may represent a local area network (LAN), an intranet, the Internet, or any other interconnected data path across which multiple devices may communicate. Also connected to network 100 is facsimile machine 120, copier 125, printer 130, scanner 135, data storage device 140, server 145, file management appliance ("FMA") 150, and portal appliance ("PA") 160.

Facsimile machine 120 is connected to network 100 and represents a device capable of transmitting and receiving data such as text and images over a telephone or other communications line ("faxing"). In one embodiment, facsimile machine 120 may transmit text and images originating in printed form or, in another embodiment, facsimile machine 120 may transmit electronic data originating from any number of devices connected to network 100. Similarly, in one embodiment, facsimile machine 120 may print a hard copy of the received data, or in another embodiment, facsimile machine 120 may forward the received data to any number of devices connected to network 100.

Copier 125 represents a device capable of reproducing text and images. In one embodiment, copier 125 is a photocopier that reproduces printed text and images, whereas in another embodiment copier 125 is a photocopier that reproduces data received from any number of devices connected to network 100.

Printer 130 represents a device capable of converting electronic data into printed text and images, whereas scanner 135 represents a device capable of converting printed text and images into electronic data. In one embodiment, facsimile machine 120, photocopier 125, printer 130, and scanner 135 are each separate and distinct devices connected to network 100. In another embodiment, a multifunction device may replace any combination of these devices. Any number of devices may be omitted from or added to network 100 without parting from the spirit and scope of the present invention.

In one embodiment, data storage device 140 is also coupled to network 100. In one embodiment, data storage device 140 represents a removable storage medium such as a CD-ROM, DVD-ROM, DVD-RAM, DVD-RW, magnetic tape or other storage medium. In an alternative embodiment, data storage device 140 represents a non-removable storage medium such as a hard or fixed disk drive. In one embodiment, data storage device 140 is an archiving device.

Server 145 represents a general purpose digital computer connected to network 100 and is configured to provide network services to other devices connected to network 100. In one embodiment, server 145 provides file sharing and printer services to network 100. In another embodiment, server 145 is a Web server that provides requested hypertext markup language (HTML) pages or files over network 100 to requesting devices. In yet another embodiment, server 145 is a server capable of providing configuration services to network 100.

FMA 150 is a file management appliance that is connected to network 100. In one embodiment FMA 150 provides document capture and indexing services. In one embodiment, FMA 150 is a device capable of providing configuration services in addition to document capture and indexing services to network 100. In one embodiment, FMA 150 is not directly connected to any device, but rather is communicatively coupled to other devices through network 100. FMA 150 is capable of publishing its presence to other devices on network 100 using the HTTP or other protocols.

Automatic document capture (or "unconscious capture"), which is discussed more fully below, is the process by which one device, requests an archiving device, such as data storage device 140, to archive a document. In one embodiment, FMA 150 is the requesting device; however, other devices can also request archival of documents. Greater detail with respect to capture of documents that are copied, faxed, printed and other documents as well as document management are disclosed in U.S. Pat. No. 5,978,477 entitled "AUTOMATIC AND TRANSPARENT DOCUMENT ARCHIVING" issued Nov. 2, 1999, which is incorporated by reference and assigned to the corporate assignee of the present U.S. Patent application.

A document may be composed of many distinct files of varying types, each representing at least the partial content of the document. A print job created on client 110 and intended for printer 130 could be captured, for example, as a thumbnail image, a postscript file, a portable document format (PDF) file, and an ASCII file containing extracted text. Additionally, FMA 150 is able to process multiple image file formats including the joint photographic experts group format (JPEG), graphics interchange format (GIF), and tagged image file format (TIFF) to name just a few. In one embodiment, each unique file type is represented by a corresponding unique file extension appended to the file's name. For example, a portable document format file may be represented as: filename.pdf, whereas a thumbnail image may be represented as: filename.thumb.

In one embodiment, FMA 150 is able to interpret compound filename extensions. For example, a thumbnail image file that contains images in a tagged image file format may be represented as filename.thumb.tiff. In one embodiment, FMA 150 uses the page number of the document as the filename. In such a manner, a document may be represented by multiple files located in the same directory, each representing a different page of the document as reflected by the filename. For example, "01.thumb.jpg" would represent a thumbnail image of page one in joint photographic experts group format. Similarly, "12.thumb.tiff" would represent a thumbnail image of page twelve in tagged image file format.

FMA 150 may index data captured from various devices connected to network 100 including printer 130, facsimile machine 120, client 110 and scanner 135. In one embodiment, facsimile machine 120 captures data over a telephone line and subsequently sends at least part of the received data to FMA 150 over network 100. In another embodiment, data sent from client 110 to facsimile machine 120 over network 100 is transparently (e.g., unbeknownst to the device) captured and at least part of the data is routed to FMA 150 for indexing.

In an alternative embodiment, facsimile machine 120 is located internal to client 110, thereby eliminating the need for client 110 to send data over network 100. In such an embodiment, FMA 150 nonetheless receives at least part of the captured data. In one embodiment, FMA 150 receives bibliographic-type data extracted from the document. In one embodiment, data received from facsimile machine 120 is composed in TIFF format, whereas data received from client 110 may retain its original format upon transfer.

The FMA capture process similarly applies to other devices connected to network 100 such as scanner 135 and copier 125. In one embodiment, if optical character recognition ("OCR") is performed on a scanned or copied document, FMA 150 creates two special OCR-related files. In one embodiment, "contents.txt" and "contents.pdf" are created and used by FMA 150 to index the full text of the document and return page images as a document file respectively.

In one embodiment, FMA 150 is capable of providing the same functionality as any one or more of the devices on network 100, thereby eliminating the need for these additional specialized devices. In one embodiment, however, FMA 150 is implemented as a thin server containing enough hardware and software to support document capture and indexing over network 100.

PA 160 is also coupled to network 100. In one embodiment, PA 160 supports searches of captured (or internal) documents stored, for example, on data storage device 140 as well as external (or public) documents available from network 170. In an alternative embodiment, the functionality of PA 160 is incorporated into FMA 150 or another device (e.g., client 110, server 145) coupled to network 100. In one embodiment network 170 is the Internet; however, network 170 can be any network of electronic devices.

In one embodiment, PA 160 operates with one or more Internet portals (e.g., yahoo.com, excite.com, go.com) to provide searching capability of external documents. Any Internet portal or any portal to an external network (e.g., a portal to a second network controlled by the organization that controls network 100) can also be used by PA 160 to provide searches of external documents. In one embodiment, the portal controls the content presented to the searching party by providing "gaps" in the search report that can be "filled" by PA 160 to present a unified search result to the searching party. In an alternative embodiment, PA 160 controls the content presented by the searching party by generating search requests to one or more portals as well as a search of data storage device 140 to search private documents. PA 160 compiles the search results and presents the results to the searching party.

Unconscious Capture

Unconscious capture is an operation in which a device (e.g., FMA 150) requests an archiving device (e.g., data storage device 140) to archive a document. In general, unconscious capture refers to FMA 150, or other device, automatically capturing documents processed by network 100 or devices coupled to network 100 without user intervention. In one embodiment, a user can optionally prevent capture of one or more documents or modify which documents are automatically captured.

Unconscious capture can be performed by any network entity or device. In one embodiment, unconscious capture utilizes standard Internet protocols and allows the capture of multiple files associated with a single document. In another embodiment, simultaneous capture of multiple documents is supported.

In one embodiment, a document is represented by a directory containing one metadata file and at least one data file. The actual name of the document directory is not important during unconscious capture as the name of the document is not stored as part of the directory system, but is instead stored within the metadata file. In one embodiment, the name of the document is stored in the metadata file using a document serial number. In one embodiment, the capture date is used for the name of the document directory.

In one embodiment, the capture protocol is an implementation of the Internet File Transfer Protocol (FTP). In one embodiment, documents are captured either as multipurpose Internet mail extension (MIME) files in the default FTP directory, or as subdirectories of the default directory. Other capture formats can also be used.

Figure 2A:
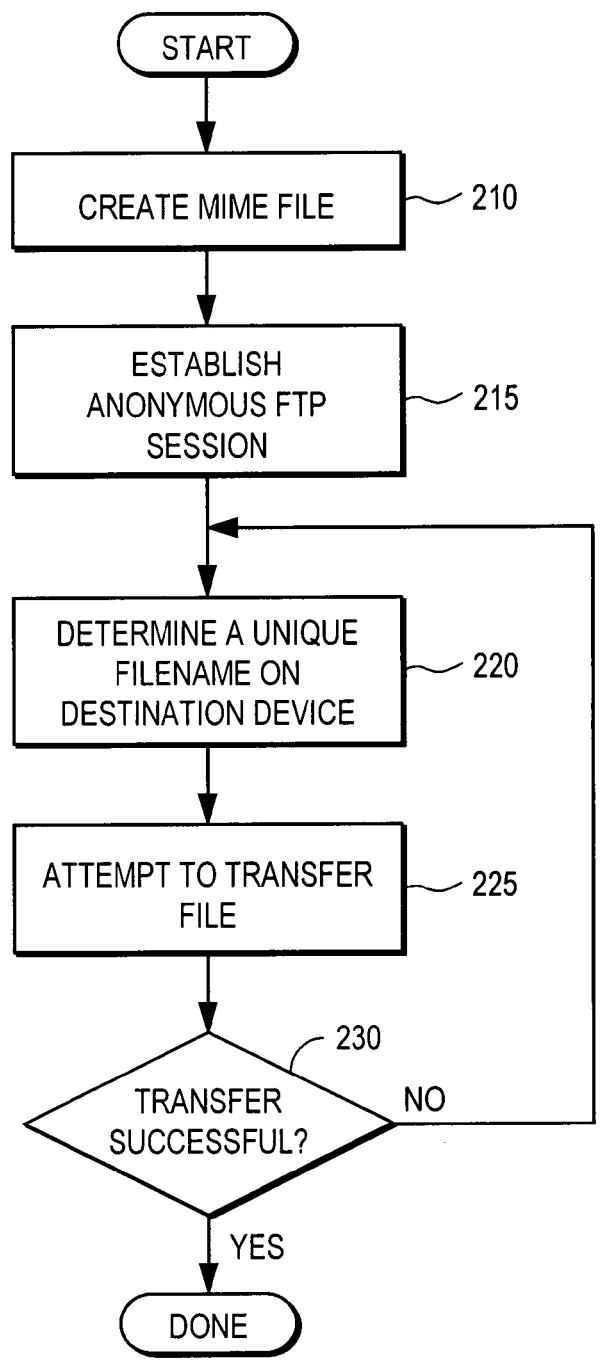
FIG. 2A illustrates one embodiment of unconscious capture using the MIME format.

FIG. 2A illustrates one embodiment of unconscious capture using the MIME format. A capturing device creates a MIME multi-part file, including all content files and a metadata file, 210. The capturing device then attempts to establish an anonymous FTP session with the destination device, 215. Once an FTP session is established, the capturing device determines a filename that is a unique on the destination device, 220 and attempts to transfer the file to the destination device, 225. If the transfer fails, the capturing device obtains a new filename and attempts the file transfer again. The capture is complete upon a successful file transfer, 230.

Figure 2B:
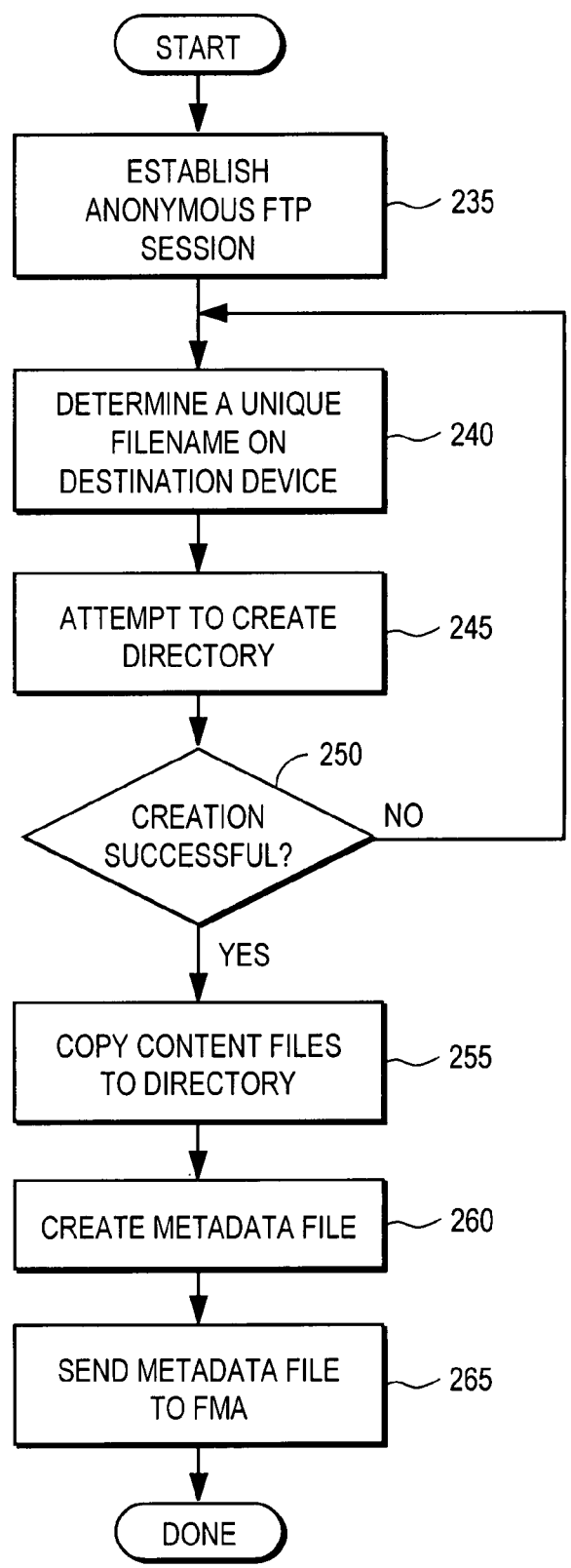
FIG. 2B illustrates one embodiment of unconscious capture in an FMA environment.

FIG. 2B illustrates one embodiment of unconscious capture in an FMA environment. The capturing device establishes an anonymous FTP session with the destination device, 235. Once the FTP session is established, the capturing device determines what it assumes to be a unique directory name on the destination device, 240. Once a directory name is determined, the capturing device attempts to create a directory with that name on the destination device, 245. If the attempt to create the directory is unsuccessful, whether due to a duplicate directory name or otherwise, the capturing device determines another directory name and attempts to create the directory again.

If, however, the capturing device successfully creates the directory on the destination device, 250, the capturing device then copies the content file or files to the newly created directory, 255. The capturing device also creates a metadata file, 260, which is then sent to the FMA device, 265 to complete the process.

Figure 2C:
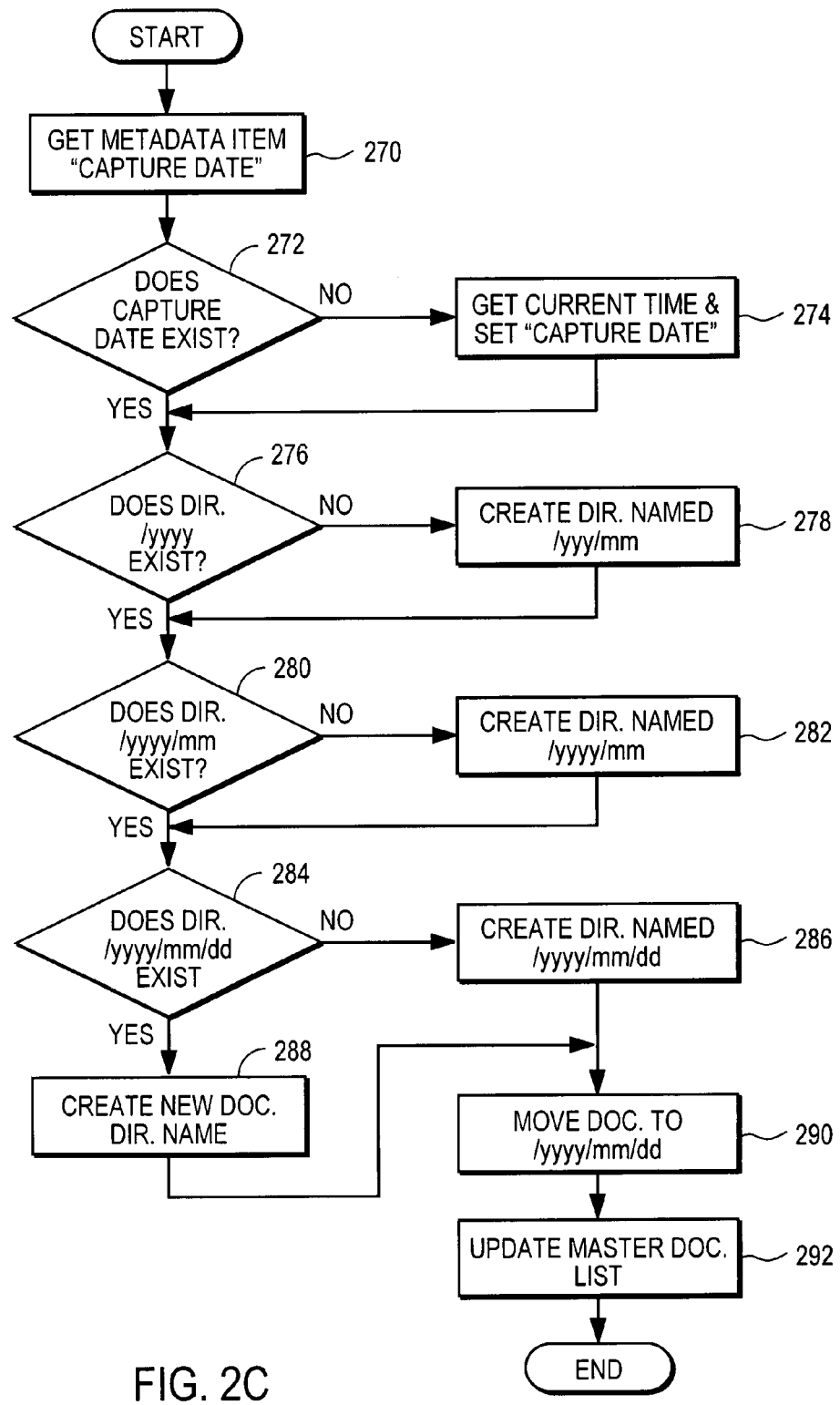
FIG. 2C illustrates one embodiment of the document storage process in a FMA environment.

FIG. 2C illustrates one embodiment of the document storage process in a FMA environment. In one embodiment the document directory is represented by "yyyy/mm/dd" where yyyy represents the year in which the document was created, mm represents the ordinal month in which the document was created, and dd represents the day of the month in which the document was created. Other date formats and/or storage ordering can also be used.

During the document storage process, the FMA creates appropriate directories, moves the document to the appropriate directory, and updates the master list. The metadata file of the document to be stored is accessed and information from its "Capture date" field is retrieved, 270. If the document's "Capture date" or even the metadata file does not exist, then the current system time is obtained and used as the document's "Capture date," 274. If, however, the document's "Capture date" does exist, the system determines whether an appropriately named directory exists.

The system determines whether a directory exists as reflected by the appropriate year, 276. If a directory reflecting the appropriate year does not exist, the system creates such a directory, 278. If a directory reflecting the appropriate year does exist, the system then checks whether a directory reflecting the appropriate month exists within that year directory, 280. If the appropriate month directory does not exist within the year directory, the system creates a month directory within the year directory, 282. If the appropriate year and month directories exist, the system finally checks whether the appropriate day directory exists within the nested year/month directory, 284.

If the day directory does not exist, the system creates the appropriate day directory within the year/month directory, 286. If a directory reflecting the appropriate year, month and day already exists, the system creates a new document directory name into which the document will be stored. In one embodiment, the system generates a four-digit random number that gets appended to the end of the existing document directory name, 288. Once a unique document directory name is established, 286 and 288, the document is moved to that directory, 290, and the master document list is updated to reflect the document's new location, 292.

Overview of a Portal Appliance

Figure 3:
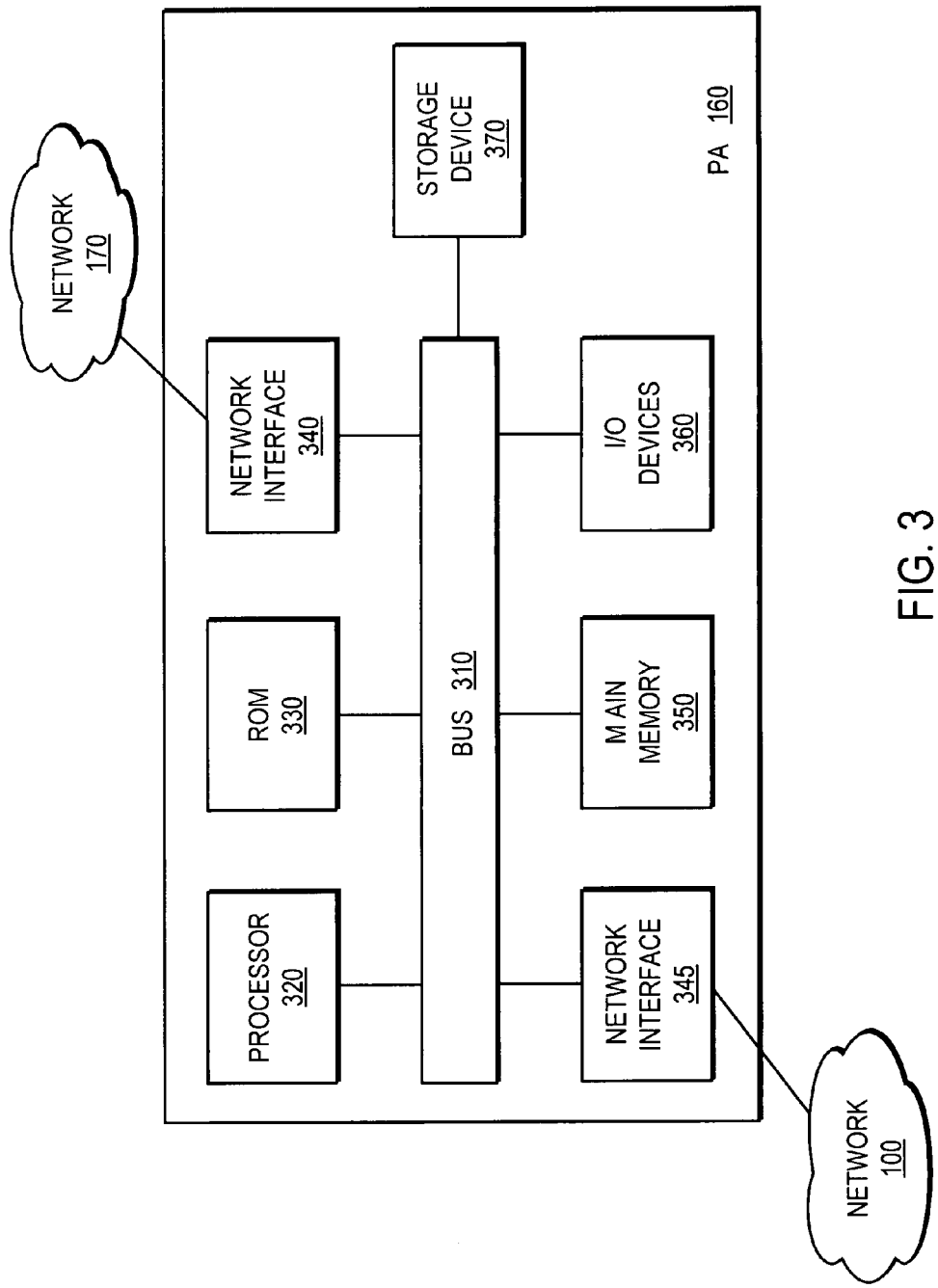
FIG. 3 illustrates one embodiment of a block diagram of a portal appliance.

FIG. 3 illustrates one embodiment of a block diagram of a portal appliance. PA 160 includes bus 310 or other communication device to communicate information, and processor 320 coupled to bus 310 to process information. While PA 160 is illustrated with a single processor, PA 160 can include multiple processors and/or co-processors. PA 160 further includes random access memory (RAM) or other dynamic storage device 350 (referred to as main memory), coupled to bus 310 to store information and instructions to be executed by processor 320. Main memory 350 also can be used to store temporary variables or other intermediate information during execution of instructions by processor 320.

PA 160 also includes read only memory (ROM) and/or other static storage device 330 coupled to bus 310 to store static information and instructions for processor 320. Storage device 370 is coupled to bus 310 to store information and instructions. Storage device 370 such as a magnetic disk or optical disc and corresponding drive can be coupled to PA 160.

PA 160 can also be coupled via bus 310 to I/O devices 360, such as a cathode ray tube (CRT) or liquid crystal display (LCD), to display information to a user, and alphanumeric input device to communicate information and command selections to processor 320. Another type of I/O device is a cursor control, such as a mouse, a trackball, or cursor direction keys to communicate direction information and command selections to processor 320 and to control cursor movement on the display. Additional and/or different I/O devices can also be coupled to bus 310.

Network interface 340 provides an interface between PA 160 and network 170. Similarly, network interface 345 provides an interface between PA 160 and network 100. In one embodiment, network interface 340 and network interface 345 are network interface cards (NICs), which are known in the art; however, any interface that can provide PA 160 with access to multiple networks can be used.

In one embodiment, PA 160 performs searches on both network 100 and network 170. According to one embodiment, the searches are performed by PA 160 in response to processor 320 executing sequences of instructions contained in main memory 350. Instructions are provided to main memory 350 from a storage device, such as magnetic disk, a read-only memory (ROM) integrated circuit (IC), CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software instructions.

Document Publication

Figure 4:
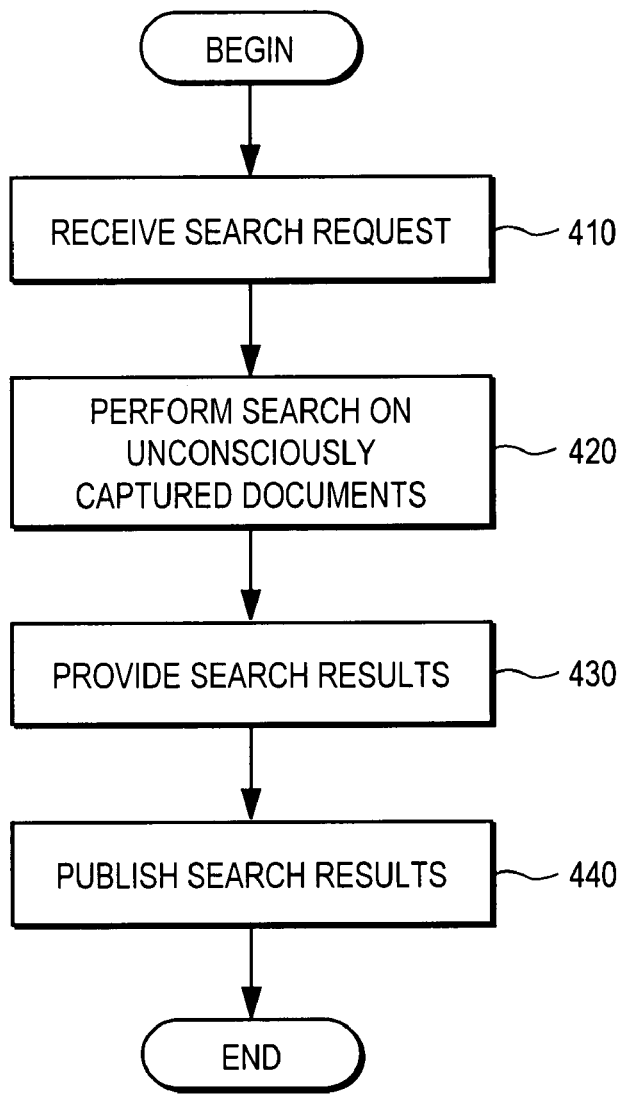
FIG. 4 is a flow diagram of one embodiment of a process for publishing a search request in response to a single user action.

FIG. 4 is a flow diagram of one embodiment of a process for publishing a search request in response to a single user action. The FMA receives a search request, 410. The search request can be in the form of a Boolean text search, a plain language text search, or any other appropriate format. The search request can be received from any device having a connection to the FMA (e.g., via a network).

In one embodiment, the FMA performs the search on the set of unconsciously captured documents at 420. In an alternate embodiment, the FMA causes another network node (e.g., the portal appliance) to perform the search. One or more searches can be performed sequentially or in parallel.

Through the document capture and indexing services of an FMA-based system, documents are archived into one or more data storage devices such as, for example, data storage device 140. In one embodiment, an archive of electronic documents is referred to as a document database wherein each document contained within the database is represented by one or more electronic data objects.

One mechanism by which users may search for and access such archived data from one or more document databases is by formulating and submitting one or more queries to the FMA system. In one embodiment, FMA queries are formulated using various search criteria to define the scope of the database search to be performed. In one embodiment, the search criteria is user-specified, whereas in another embodiment the search criteria may be automatically generated by the FMA or similar device. In one embodiment, each of the various metadata attributes of the FMA are indexed by the FMA and may be specified within a query to be searched. It should be noted that, however, in one embodiment, items within the document database need not be indexed in order to be searched.

In one embodiment, queries within an FMA system are treated as documents within the FMA document database and accordingly may be archived within the database for later retrieval and execution. In one embodiment, metadata files, similar to those associated with non-query documents, are created for and associated with each saved query document. Such metadata files may include searchable attributes describing various query properties such as, for example, who formulated the query, the date and time the query was formulated, the date and time the query was most recently executed or updated, and so forth. Thus, by treating queries as documents, the queries themselves become searchable data objects stored within the database.

Given the large number of documents that may be stored within an FMA-based system, as well as the flexibility one is afforded when formulating queries in such a system, it is easy to imagine that the number of documents returned by the FMA from one search to another may vary greatly. Furthermore, even though a given query may result in a large number of documents that match the stipulated search criteria, it does not necessarily follow that all such documents returned by the FMA will be considered relevant to the user. If a query proves to be particularly useful to a user, the user may wish to save the query for further use at a later date. The user may, at a later date, simply re-execute the query in its current form, or more likely, the user may wish to modify the query by changing or supplementing the search criteria prior to its re-execution. In one embodiment, the FMA provides a way for which users may execute, save, update, and re-execute database queries.

In the event a query returns a large number of documents, the user may wish to sort through the documents to identify those that are most relevant according the user's needs at the time. Unfortunately, without the presence of some form of descriptive information identifying the contents of each document, a user may inadvertently overlook one or more relevant documents. In one embodiment, the FMA system provides a mechanism for users to attach descriptive comment data to queries so as to facilitate database searching. For instance, a user may wish to enter an amount of text summarizing various aspects of a given query including, for example, why a particular set of search criteria was chosen, the search topic, and so forth.

In one embodiment, comment data is used to describe both newly formulated queries as well as preexisting query-documents. Comment data, however, is not limited in form to just text data. In one embodiment, comment data may include data formats other than text data including for example, audio data, digital image data, and motion video data. In one embodiment, comment data within the FMA system is both indexed and searchable.

The search results are provided at 430. In one embodiment, the FMA provides the search results to the device requesting the search. In alternate embodiments, the FMA can provide the search results to a different device. The search results can be displayed in any manner known in the art. In one embodiment, the FMA uses CGI scripting to generate one or more web pages to display specific query results. FMA query results may be graphically displayed in a variety of time-oriented views such as, for example, a list view and a calendar view, or in a variety of content-oriented views such as, for example, a stream view and a thumbnail view. In one embodiment, a user may selectively alternate between each query result view depending upon the document display preferences.

The search results are published at 440 in response to a user request. In one embodiment, the search results are published in response to a single action performed by the user (e.g., a mouse click, a spoken command). In alternate embodiments, the search results are published in response to a sequence of user actions, for example, providing a publication device, performing user authentication and determining an authorized audience.

In one embodiment, a World Wide Web server is used to publish the search results. The Web server can be independent of the organization controlling the FMA and the unconsciously captured documents. By publishing via an independent Web server, security devices (e.g., firewalls) that are used to provide security for the organization are not used to protect the published search results. This provides easier access for the parties (e.g., specified groups, the public) to which the search results are published.

Publication services can be provided by, for example, a party other than the organization that unconsciously captures the documents. Publication services can be provided for a fee based on the amount of storage required, the number of accesses to the published documents, a flat rate, or in any other manner. The party providing the publication service can, for example, attach advertising (e.g., a banner) to the published documents to generate additional revenue. Publication services can be provided by, for example, an Internet portal or other service that is relatively easily accessible and possibly well-known to users of the network on which the documents are published.

In one embodiment, an organization having a non-public network on which documents are unconsciously captured contracts with a publication service provider to provide publication services. For example, at the time the parties contract for publication services publication criteria can be determined including, but not limited to, domain names to be used, access privileges, authorization for various individuals, whether certain documents, or types of documents, are non-publishable.

In one embodiment, the Web server provides access to the published documents based upon access terms negotiated between two organizations (e.g., the organization that controls the documents that are searched and the organization the controls the Web server). The phrase "access terms" is used herein to describe conditions according to which the client may be subject to in order to access a network-based application. "Access terms" include and/or are used synonymously with lease terms, license terms, usage terms and the like.

The document publication access terms may be negotiated "in person" between the two organizations, or alternatively the access terms may be negotiated automatically between the FMA and the Web server. In any event, the negotiated terms may be incorporated within messages identifying and/or replicating the documents to be published by an access monitoring module which automatically verifies proper access privileges of the requesting device and grants access to the requested application based upon proper certification and/or authentication. In one embodiment, the Web server is responsible for monitoring and/or granting access to the documents.

In one embodiment, document access is based upon identification of the party attempting to access the published documents. Additionally, access to one or more documents may be limited by a number of concurrent documents as well as an upper bound on the number of times an document may be accessed. For example, one license agreement may stipulate access terms that limit a document access to 5 concurrent client accesses, whereas a second license agreement may stipulate access terms that limit a document access to 5 total accesses regardless of when or how the accesses occur. The Web server may track client access privileges through the use of a simple lookup table for example, which may or may not be encrypted. Upon verifying that access to the documents is proper, access is enabled.

Figure 5:
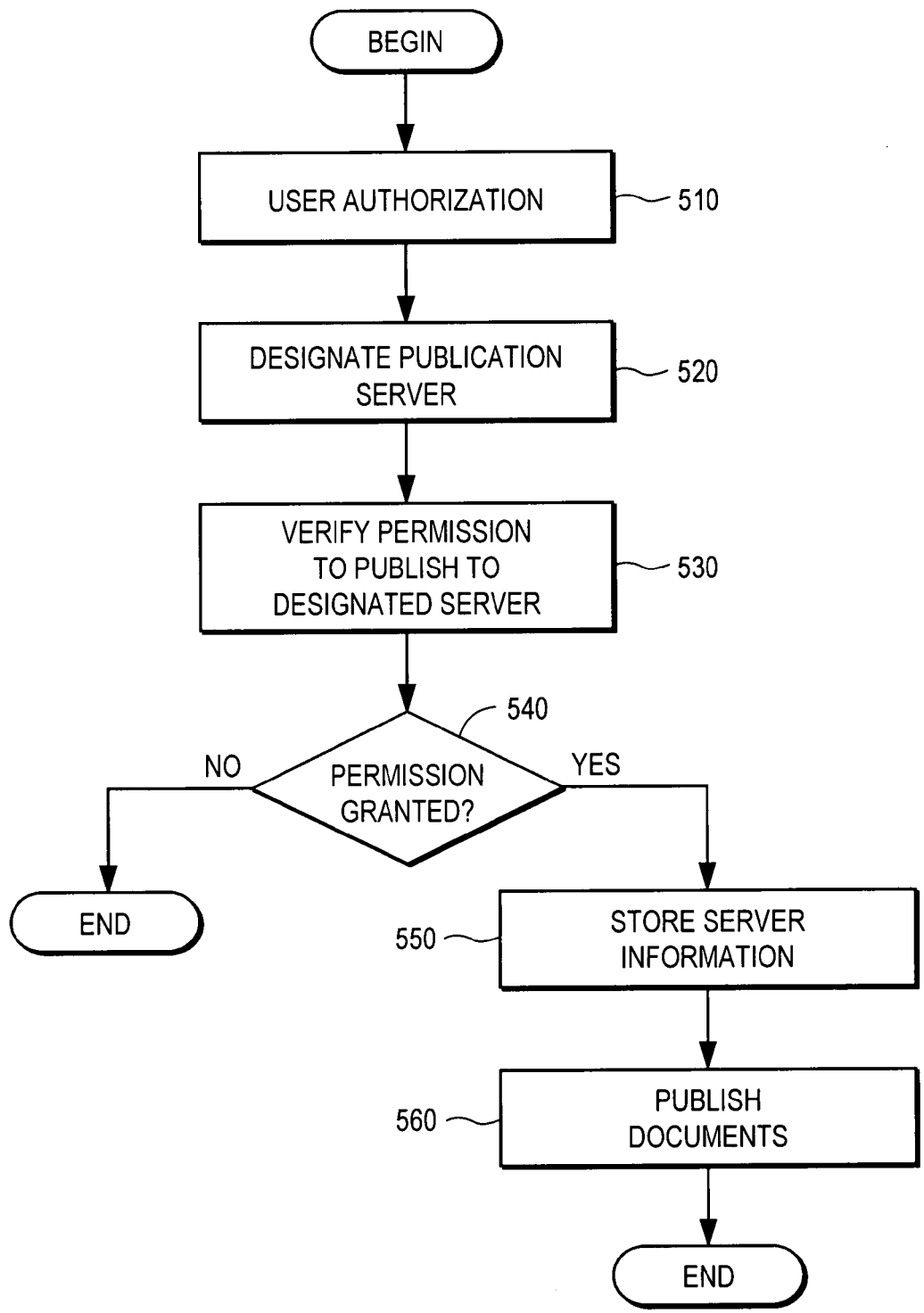
FIG. 5 is a flow diagram of one embodiment of a process for providing publication in response to a single user action.

FIG. 5 is a flow diagram of one embodiment of a process for providing publication in response to a single user action. In one embodiment, information is gathered from a user to allow the user to publish documents from a search result with a single action. In alternate embodiments, some or all of the information is gathered automatically.

In one embodiment, publication information includes a "location of publication," which can be, for example, a Universal Resource Locator (URL) to a server that is selected to publish the documents. The location of publication may provide controlled or limited access, in which case, the user may be required to provide additional authorization information. In one embodiment, information related to publication of documents is gathered prior to the search that identifies the documents to be published. By gathering the information before the search, publication of the search results is simplified (e.g., can be provided in response to a single action). Also, if multiple search results are published in the same manner (e.g., to the same server), gathering the publication information allows a user to publish multiple search results without entering the authorization and/or publication information multiple times.

User authorization is performed at 510. In one embodiment, user authorization included verifying the identity of the user, for example, through a user name a password combination, use of an identifying device such as a card, fingerprint, or other technique for verifying the identity of the user.

A server is designated for publication of one or more documents from the search result at 520. In one embodiment, the server used for publication is not part of the network in which the documents to be searched are unconsciously captured. For example, a party independent of the organization controlling the documents to be searched can provide a publication service, for example, a public Web server, on which the documents can be published.

The party wishing to publish documents with the designated server is verified at 530. Verification can be performed on multiple levels. For example, an organization controlling the documents that are searched can determine whether the user wishing to publish documents has the authority to publish any or all of the documents. The organization providing the server on which the documents are published can determine whether the user or the organization to which the user belongs is authorized to publish the documents in the forum or manner requested. A government can determine whether certain documents can be published. Other permissions can also be verified.

If permission is not granted at 540, the process ends. If permission is granted at 540, the server information is stored at 550. The server information and/or permissions can be stored in any manner known in the art, for example, cookies can be used. Documents are published at 560.

In one embodiment, in association with publication of the documents, a URL, or other link or pointer to the documents, is provided to the user causing the documents to be published. The user can then provide the URL to others who may be interested in accessing one or more of the published documents. In one embodiment, the URL is automatically placed in a "clipboard" of the device used to request publication of the documents. A clipboard is a feature commonly used in computer systems to store information that has been cut, copied, or otherwise edited so that the information can be "pasted" into another document or application. By automatically placing the URL on the clipboard, the user can, for example, paste the URL in an e-mail message to announce publication of the documents.

While the publication process described with respect to FIG. 5 is described as providing publication of documents in response to a single user action, any number of user actions can be used to publish documents. For example, in response to a search, a user can be provided with an option to publish the results and in response to an affirmative indication from the user (e.g., button selection, spoken command, keyboard stroke), the user can be provided with a list of servers that are available to publish the documents, or available methods of publication. The user then makes a second action to select the desired server. A third action can be required to confirm the desire to publish.

In an alternative embodiment, publication can be accomplished in response to a "drag and drop" action by the user. In one exemplary drag and drop embodiment, an icon of a graphical interface displayed on a display device is manipulated to accomplish publication. For example, an icon representing a document (or a search result including one or more documents) can be selected and the user can drag the icon to a window, field, icon, or other indication of the method or device for publication to cause the publication to occur.

Figure 6:
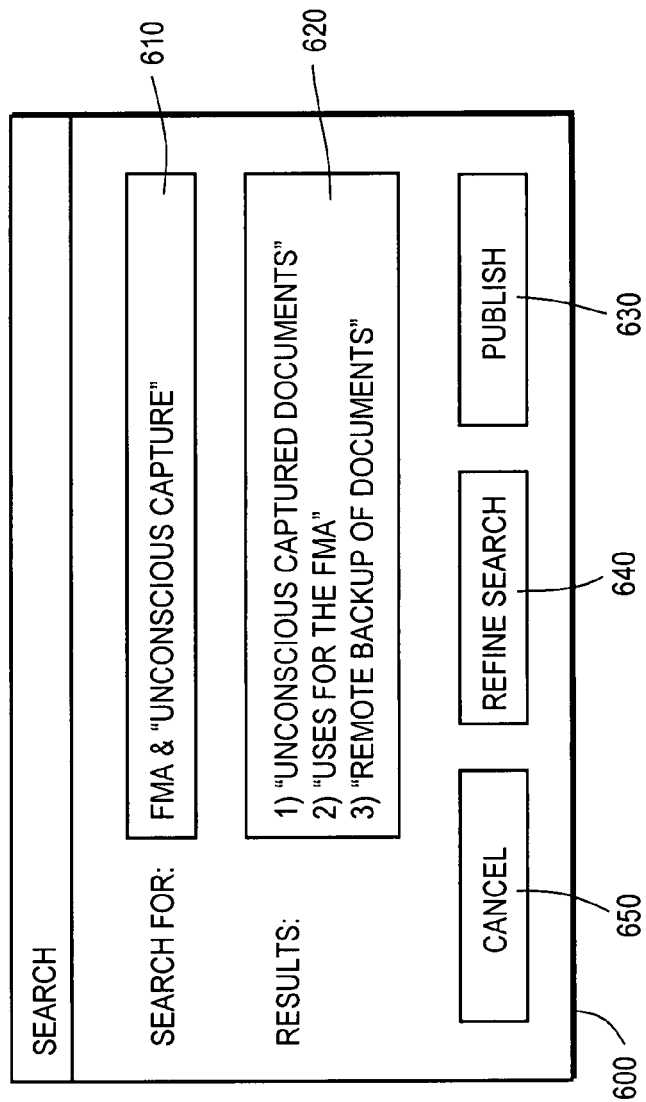
FIG. 6 illustrates one embodiment of a graphical user interface that allows publication of search results in response to a single user action.

FIG. 6 illustrates one embodiment of a graphical user interface that allows publication of search results in response to a single user action. In one embodiment, the interface of FIG. 6 is provided as dialog box within a window provided by a networked device; however, other configurations, for example, a dedicated search interface, can also be provided.

Within dialog box 600, a user enters search criteria (e.g., FMA & "unconscious capture") in search field 610. Searches can be performed in any manner known in the art. In one embodiment, the search is performed on unconsciously captured documents. In an alternate embodiment, the search is performed on unconsciously captured documents as well as other documents, for example, documents available on the World Wide Web, or documents available from predetermined sources independent of the organization controlling the unconsciously captured documents. In results field 620, any documents meeting the search criteria are presented.

In one embodiment, the user is allowed to cancel the search by clicking on cancel button 650. In one embodiment, the user is allowed to refine the search by clicking on refine search button 640. In alternate embodiments, the user is provided with additional and/or different search options via some combination of buttons, pull down menus, pop up menus, spoken commands, function keys, keystroke commands, etc.

In one embodiment, dialog box 600 includes publish button 630 that allows a user to publish the search results in response to a single user action. In one embodiment, publication of the documents causes the documents identified by the search results to be accessed by some server device. For example, the documents identified by the search can be copied to a Web server and be available to any party that has access to the server. Documents can be published in any manner known in the art.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:

selecting on an electronic system one or more documents from a set of unconsciously captured documents displayed as a search result in response to a search query, the search result displayed with a button, which when activated, causes transmission of the selected one or more documents to a publicly accessible Web server, wherein the unconsciously captured documents are captured by a capturing device and stored in a storage device, wherein the capturing device creates a MIME multi-part file including a content file and a metadata file and establishes an FTP session with the storage device to transfer the MIME multi-part file to the storage device, and wherein the unconsciously captured documents are represented by a directory of the storage device having one metadata file and at least one data file; and publishing the one or more documents in response to an activation on the button displayed within the search result by sending the one or more documents to the publicly accessible Web server over a network separated from the electronic system, wherein the publicly accessible Web server is operated by an organization that is operationally independent of an organization that controls the unconsciously captured documents according to a contract having one or more access terms negotiated between the two organizations.

2. The method of claim 1 wherein the activation of the button comprises a single action of clicking the button using a pointing device within the search result listing the set of the unconsciously captured documents displayed on the electronic system.

3. The method of claim 1 further comprising a single action of speaking a sound to cause the transmission of the selected one or more documents, when a page listing the set of the unconsciously captured documents is displayed on the electronic system.

4. The method of claim 1 further comprising dragging and dropping the one or more selected documents into a dedicated field of a page listing the set of unconsciously captured documents prior to activating the button.

5. The method of claim 1 further comprising performing a search of the unconsciously captured documents in a database in response to the search query, the database storing other consciously captured documents other than the unconsciously captured documents, wherein the search query includes an attribute specifying that the search is to be performed only on unconsciously captured documents, and wherein the one or more selected documents are selected from a search result of the unconsciously captured documents from the database.

6. The method of claim 5, wherein the publication is performed in response to a single activation of a control displayed within the search result after the one or more documents are selected from the search result.

7. The method of claim 1, further comprising attaching one or more advertisements on the selected documents published on the Web server.

8. The method of claim 1 further comprising:

generating a link to the one or more published documents; and placing the link in a storage of the electronic system to allow a user to obtain the link to access the published documents on the Web server via the link.

9. The method of claim 8, wherein the storage of the electronic system is a clipboard of a desk-top running within the electronic system, such that the user can cut and paste the link into another electronic document.

10. The method of claim 9, further comprising sending an email containing the link to a second user in order to enable the second user to access the published documents.

11. The method of claim 8, wherein the link includes a URL linking with the published documents on the Web server.

12. The method of claim 1 further comprising generating access privileges associated with the one or more published documents.

13. The method of claim 1 further comprising collecting configuration information including specifying a location of the Web server to allow publishing in response to the predetermined single action.

14. The method of claim 13, wherein specifying a location of the Web server comprises:

specifying a URL associated with the Web server; and performing authentication of the user with respect to the Web server to determine whether the user has rights to publish a document on the specified Web server.

15. The method of claim 1, wherein the unconsciously captured documents are captured without user intervention when corresponding physical documents are reproduced via a document reproduction system.

16. A machine-readable medium having stored thereon sequences of instructions that, when executed, cause one or more electronic systems to:

select an electronic system one or more documents from a set of unconsciously captured documents displayed as a search result in response to a search query, the search result displayed as a search result in response to a search query, the search result displayed with a button, which when activated, causes transmission of the selected one or more documents to a publicly accessible Web server, wherein the unconsciously captured documents are captured by a capturing device and stored in a storage device, wherein the capturing device creates a MIME multi-part file including a content file and a metadata file and establishes an FTP session with the storage device to transfer the MIME multi-part file to the storage device, and wherein the unconsciously captured documents are represented by a directory of the storage device having one metadata file and at least one data file; and publish the one or more documents in response to an activation on the button displayed within the search result by a user by sending the one or more documents to the publicly accessible Web server over a network separated from the electronic system, wherein the publicly accessible Web server is operated by an organization that is operationally independent of an organization that controls the unconsciously captured documents according to a contract having one or more access terms negotiated between the two organizations.

17. The machine-readable medium of claim 16 wherein the activation of the button comprises a single action of clicking the button using a pointing device within the search result listing the set of the unconsciously captured documents displayed on the electronic system.

18. The machine-readable medium of claim 16 further comprising a single action of speaking a sound to cause the transmission of the selected one or more documents, when a page listing the set of the unconsciously captured documents is displayed on the electronic system.

19. The machine-readable medium of claim 16 further comprising dragging and dropping the one or more selected documents into a dedicated field of a page listing the set of unconsciously captured documents prior to activating the button.

20. The machine-readable medium of claim 16 wherein the sequences of instructions that cause the one or more electronic systems to select one or more documents from a set of unconsciously captured documents comprises sequences of instructions that, when executed, cause the one or more electronic systems to perform a search of the unconsciously captured documents in a database in response to the search query, the database storing other consciously captured documents other than the unconsciously captured documents, wherein the search query includes an attribute specifying that the search is to be performed only on unconsciously captured documents, and wherein the one or more selected documents are selected from a search result of the unconsciously captured documents from the database.

21. The machine-readable medium of claim 16 further comprising sequences of instructions that, when executed, cause the one or more electronic systems to
generate a link to the one or more published documents, and
place the link in a storage of the electronic system to allow a user to obtain the link to access the published documents on the Web server via the link.

22. The machine-readable medium of claim 16 further comprising generating access privileges associated with the one or more published documents.

23. The machine-readable medium of claim 16 further comprising collecting configuration information including specifying a location of the Web server to allow publishing in response to the predetermined single action.

24. A computer data signal embodied in a data communications medium shared among a plurality of network devices comprising sequences of instructions that, when executed, cause one or more electronic systems to:
select on an electronic system one or more documents from a set of unconsciously captured documents displayed as a search result in response to a search query, the search result displayed as a search result in response to a search query, the search result displayed with a button, which when activated, causes transmission of the selected one or more documents to a publicly accessible Web server, wherein the unconsciously captured documents are captured by a capturing device and stored in a storage device, wherein the capturing device creates a MIME multi-part file including a content file and a metadata file and establishes an FTP session with the storage device to transfer the MIME multi-part file to the storage device, and wherein the unconsciously captured documents are represented by a directory of the storage device having one metadata file and at least one data file; and
publish the one or more documents in response to an activation on the button displayed within the search result by sending the one or more documents to the publicly accessible Web server separated from the electronic system,
wherein the publicly accessible Web server is operated by an organization that is operationally independent of an organization that controls the unconsciously captured documents according to a contract having one or more access terms negotiated between the two organizations.

25. The computer data signal of claim 24 wherein the activation of the button comprises a single action of clicking the button using a pointing device within the search result listing the set of the unconsciously captured documents displayed on the electronic system.

26. The computer data signal of claim 24 further comprising a single action of speaking a sound to cause the transmission of the selected one or more documents, when a page listing the set of the unconsciously captured documents is displayed on the electronic system.

27. The computer data signal of claim 24 further comprising dragging and dropping the one or more selected documents into a dedicated field of a page listing the set of unconsciously captured documents prior to activating the button.

28. The computer data signal of claim 24 wherein the sequences of instructions that cause the one or more electronic systems to select one or more documents from a set of unconsciously captured documents comprises sequences of instructions that, when executed, cause the one or more electronic systems to perform a search of the unconsciously captured documents in a database in response to the search query, the database storing other consciously captured documents other than the unconsciously captured documents, wherein the search query includes an attribute specifying that the search is to be performed only on unconsciously captured documents, and wherein the one or more selected documents are selected from a search result of the unconsciously captured documents from the database.

29. The computer data signal of claim 24 further comprising sequences of instructions that, when executed, cause the one or more electronic systems to
generate a link to the one or more published documents, and
place the link in a storage of the electronic system to allow a user to obtain the link to access the published documents on the Web server via the link.

30. The computer data signal of claim 24 further comprising generating access privileges associated with the one or more published documents.

31. The computer data signal of claim 24 further comprising collecting configuration information including specifying a location of the Web server to allow publishing in response to the predetermined single action.

32. An apparatus comprising:
a bus;
a processor coupled to the bus;
a memory coupled to the bus, the memory to store sequences of instructions that, when executed, cause one or more electronic systems to
select on an electronic system one or more documents from a set of unconsciously captured documents displayed as a search result in response to a search query, the search result displayed as a search result in response to a search query, the search result displayed with a button, which when activated, causes transmission of the selected one or more documents to a publicly accessible Web server, wherein the unconsciously captured documents are captured by a capturing device and stored in a storage device, wherein the capturing device creates a MIME multi-part file including a content file and a metadata file and establishes an FTP session with the storage device to transfer the MIME multi-part file to the storage device, and wherein the unconsciously captured documents are represented by a directory of the storage device having one metadata file and at least one data file; and publish the one or more documents in response to an activation on the button displayed within the search result by sending the one or more documents to the publicly accessible Web server separated from the electronic system, wherein the publicly accessible Web server is operated by an organization that is operationally independent of an organization that controls the unconsciously captured documents according to a contract having one or more access terms negotiated between the two organizations.

33. The apparatus of claim 32 wherein the activation of the button comprises a single action of clicking the button using a pointing device within the search result listing the set of the unconsciously captured documents displayed on the electronic system.

34. The apparatus of claim 32 further comprising a single action of speaking a sound to cause the transmission of the selected one or more documents when a page listing the set of the unconsciously captured documents is displayed on the electronic system.

35. The apparatus of claim 32 further comprising dragging and dropping the one or more selected documents into a dedicated field of a page listing the set of unconsciously captured documents prior to activating the button.

36. The apparatus of claim 32 wherein the sequences of instructions that cause the one or more electronic systems to select one or more documents from a set of unconsciously captured documents comprises sequences of instructions that, when executed, cause the one or more electronic systems to perform a search of the unconsciously captured documents in a database in response to the search query, the database storing other consciously captured documents other than the unconsciously captured documents, wherein the search query includes an attribute specifying that the search is to be performed only on unconsciously captured documents, and wherein the one or more selected documents are selected from a search result of the unconsciously captured documents from the database.

37. The apparatus of claim 32 further comprising sequences of instructions that, when executed, cause the one or more electronic systems to
    generate a link to the one or more published documents, and
    place the link in a storage of the electronic system to allow a user to obtain the link to access the published documents on the Web server via the link.

38. The apparatus of claim 32 further comprising generating access privileges associated with the one or more published documents.

39. The apparatus of claim 32 further comprising collecting configuration information including specifying a location of the Web server to allow publishing in response to the predetermined single action.

40. An apparatus comprising:
    means for selecting on an electronic system one or more documents from a set of unconsciously captured documents displayed as a search result in response to a search query, the search result displayed as a search result in response to a search query, the search result displayed with a button, which when activated, causes transmission of the selected one or more documents to a publicly accessible Web server, wherein the unconsciously captured documents are captured by a capturing device and stored in a storage device, wherein the capturing device creates a MIME multi-part file including a content file and a metadata file and establishes an FTP session with the storage device to transfer the MIME multi-part file to the storage device, and wherein the unconsciously captured documents are represented by a directory of the storage device having one metadata file and at least one data file; and
    means for publishing the one or more documents in response to an activation on the button displayed within the search result by a user by sending the one or more documents to the publicly accessible Web Server over a network separated from the electronic system
wherein the publicly accessible Web server is operated by an organization that is operationally independent of an organization that controls the unconsciously captured documents according to a contract having one or more access terms negotiated between the two organizations.

41. The apparatus of claim 40 wherein the activation of the button comprises a single action of clicking the button using a pointing device within the search result listing the set of the unconsciously captured documents displayed on the electronic system.

42. The apparatus of claim 40 further comprising a single action of speaking a sound to cause the transmission of the selected one or more documents, when a page listing the set of the unconsciously captured documents is displayed on the electronic system.

43. The apparatus of claim 40 further comprising dragging and dropping the one or more selected documents into a dedicated field of a page listing the set of unconsciously captured documents prior to activating the button.

44. The apparatus of claim 40 further comprising means for performing a search of the unconsciously captured documents in a database in response to the search query, the database storing other consciously captured documents other than the unconsciously captured documents, wherein the search query includes an attribute specifying that the search is to be performed only on unconsciously captured documents, and wherein the one or more selected documents are selected from a search result of the unconsciously captured documents from the database.

45. The apparatus of claim 40 further comprising:
    means for generating a link to the one or more published documents; and
    means for placing the link in a storage of the electronic system to allow a user to obtain the link to access the published documents on the Web server via the link.

46. The apparatus of claim 40 further comprising means for generating access privileges associated with the one or more published documents.

47. The apparatus of claim 40 further comprising means for collecting configuration information including specifying a location of the Web server to allow publishing in response to the predetermined single action.

* * * * *